United States Patent
Lee et al.

(10) Patent No.: US 8,471,889 B1
(45) Date of Patent: Jun. 25, 2013

(54) ADJUSTING AN IMAGE FOR VIDEO CONFERENCE DISPLAY

(75) Inventors: Woo Jae Lee, Overland Park, KS (US); Hannah Jo Sifuentes, Raytown, MO (US); Trevor Daniel Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 653 days.

(21) Appl. No.: 12/722,323

(22) Filed: Mar. 11, 2010

(51) Int. Cl.
*H04N 7/14* (2006.01)

(52) U.S. Cl.
USPC .......... 348/14.07; 348/14.08; 348/14.16; 379/202.01; 379/387.01; 715/719; 715/764

(58) Field of Classification Search
USPC ............. 348/14.01–14.16; 370/259–271, 370/351–357; 455/412.1–420, 426.1, 426.2, 455/550.1–560, 575.1–575.9, 90.1–90.3; 709/201–207, 217–248
See application file for complete search history.

(56) References Cited

U.S. PATENT DOCUMENTS

| | | | | |
|---|---|---|---|---|
| 5,940,118 | A * | 8/1999 | Van Schyndel | 348/14.05 |
| 6,445,405 | B1 * | 9/2002 | Allen et al. | 348/14.08 |
| 7,148,909 | B2 * | 12/2006 | Yui et al. | 345/660 |
| 7,176,957 | B2 * | 2/2007 | Ivashin et al. | 348/14.09 |
| 7,454,460 | B2 * | 11/2008 | Ivashin | 709/203 |
| 7,466,335 | B2 * | 12/2008 | Hirata et al. | 348/14.08 |
| 7,515,174 | B1 * | 4/2009 | Francisco et al. | 348/14.16 |
| 7,710,450 | B2 * | 5/2010 | Dhuey et al. | 348/14.08 |
| 8,072,481 | B1 * | 12/2011 | McNelley et al. | 348/14.16 |
| 8,085,290 | B2 * | 12/2011 | Graham et al. | 348/14.01 |
| 8,164,617 | B2 * | 4/2012 | Mauchly | 348/14.08 |
| 2004/0017394 | A1 * | 1/2004 | Adachi | 345/744 |
| 2004/0236830 | A1 * | 11/2004 | Nelson et al. | 709/204 |
| 2005/0024484 | A1 * | 2/2005 | Leonard et al. | 348/14.01 |
| 2006/0062367 | A1 * | 3/2006 | Christenson et al. | 379/202.01 |
| 2006/0103508 | A1 * | 5/2006 | Sato | 340/286.01 |
| 2006/0158509 | A1 * | 7/2006 | Kenoyer et al. | 348/14.08 |
| 2006/0245379 | A1 | 11/2006 | Abuan et al. | |
| 2007/0064094 | A1 * | 3/2007 | Potekhin et al. | 348/14.08 |
| 2007/0263080 | A1 * | 11/2007 | Harrell et al. | 348/14.08 |
| 2007/0269111 | A1 | 11/2007 | Bolin et al. | |
| 2007/0279483 | A1 * | 12/2007 | Beers et al. | 348/14.08 |
| 2007/0279484 | A1 * | 12/2007 | Derocher et al. | 348/14.09 |
| 2008/0062252 | A1 * | 3/2008 | Kawamura et al. | 348/14.09 |
| 2009/0040288 | A1 * | 2/2009 | Larson | 348/14.09 |
| 2009/0051756 | A1 * | 2/2009 | Trachtenberg et al. | 348/14.08 |
| 2009/0096861 | A1 * | 4/2009 | Saleh et al. | 348/14.08 |
| 2009/0210491 | A1 | 8/2009 | Thakkar et al. | |
| 2009/0237560 | A1 * | 9/2009 | Ganzaroli et al. | 348/511 |
| 2009/0309897 | A1 * | 12/2009 | Morita et al. | 345/629 |
| 2010/0037151 | A1 * | 2/2010 | Ackerman et al. | 715/753 |

(Continued)

*Primary Examiner* — Hemant Patel

(57) ABSTRACT

A video conferencing system contains one or more display adjusting components, whereby an object to be displayed can be adjusted to appropriately fit various sized display screens. A display adjusting component is contained within the sending client, which adjusts the image of the object to be appropriately displayed to one or more receiving clients. The receiving clients also contain a display adjusting component, which can further adjust the image of the object to be displayed, as necessary. The multimedia conferencing server of the video conferencing system also contains a display adjusting component, which negotiates parameters of the sending and receiving clients. Any of the display adjusting components can function alone, or in any combination together. A method, and computer readable media which contain computer readable instructions to perform a method, of adjusting an image for video conference display are also described.

19 Claims, 3 Drawing Sheets

U.S. PATENT DOCUMENTS

| | | |
|---|---|---|
| 2010/0118200 A1* | 5/2010 | Gelman et al. ................ 348/578 |
| 2010/0128105 A1* | 5/2010 | Halavy ....................... 348/14.05 |
| 2010/0149307 A1* | 6/2010 | Iyer et al. ................... 348/14.09 |
| 2010/0166055 A1* | 7/2010 | Schmit et al. ............ 375/240.01 |
| 2010/0302446 A1* | 12/2010 | Mauchly et al. .............. 348/598 |
| 2011/0074911 A1* | 3/2011 | Khouri et al. .............. 348/14.08 |

* cited by examiner

ADJUSTING AN IMAGE FOR VIDEO CONFERENCE DISPLAY

INTRODUCTION

A conventional video conference system displays the same proportional size of an image, regardless of the size of the display screen. Therefore, a large display screen would project a large life-sized image. This frequently results in the image being out of focus. In addition, a large sized image of a person can have the appearance of being over bearing or making conference viewers uncomfortable. Likewise, a conventional video conference system displays a small life-sized image onto a small display screen, which may be difficult to view clearly.

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

Embodiments of the invention use one or more display adjusting components to adjust the image to appropriately fit various sized display screens. A large display screen will down-size the displayed image and include more background video content. Likewise, a small display screen will up-size the displayed image and include little or no background video content, thereby providing clearer detail and more attention on the image. Adjusting an image to an appropriate fit is achieved by utilizing one or more display adjusting components at a sending client, a receiving client, or a multimedia conferencing server. The display adjusting component of the sending client will usually adjust the image first to its capabilities, then the display adjusting components of the receiving clients will further adjust the image to fit their respective display screens. However, this particular order of steps is not a requirement of the invention. The multimedia conferencing server also comprises a display adjusting component, which negotiates from known factors of the sending and receiving clients, and works to overcome any limitations of either the sending or receiving clients. Embodiments of the invention contemplate using any of the display adjusting components alone or in any combination with each other.

Displayed objects comprise, for example, an image of a participant of a video conference meeting, an inanimate object, or an electronic display of text, graphics, or other matter to be discussed as part of the video conference meeting.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Figure 1:
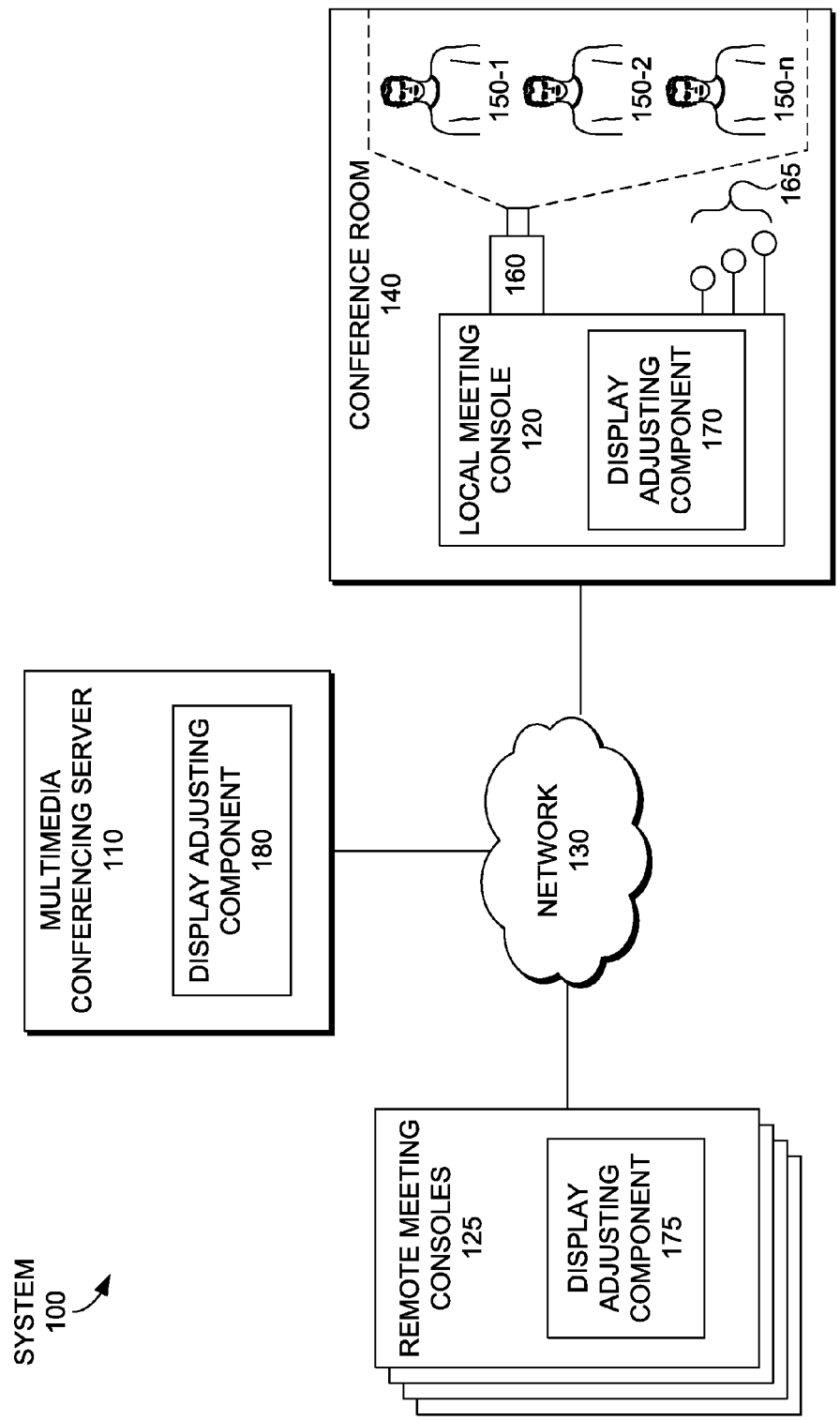
FIG. 1 is a block diagram of a multimedia conferencing system according to embodiments of the invention.

Embodiments of the invention provide systems, methods, and computer-readable media with computer-readable instructions embodied thereon for adjusting an image of a video conference display. The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated systems, methods and computer-readable media. These acronyms and shorthand notations are intended to help provide an easy methodology for communicating the ideas expressed herein and are not meant to limit the scope of any embodiment of the invention.

Embodiments of the invention include, among other things, a method, system, or set of instructions embodied on one or more computer-readable media. Computer-readable media include both volatile and nonvolatile media, removable and non-removable media, and media readable by a database and various other network devices. Computer-readable media comprise computer storage media. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to, or remote from, the processing system. Combinations of any of the above should also be included within the scope of computer-readable media.

An operating environment for devices and interfaces used for embodiments of the invention include a processing system with one or more high speed central processing unit(s) ("CPU"), or other types of processors, and a memory system. The embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

Embodiments may be generally directed to multimedia conferencing systems arranged to provide meeting and collaboration services to multiple participants over a network. Some multimedia conferencing systems may be designed to operate with various packet-based networks over an interconnected computing network, such as the Internet or World Wide Web (WWW), to provide web-based conferencing services. Such implementations are sometimes referred to as web conferencing systems. Other multimedia conferencing systems may be designed to operate for a private interconnected computing network, business, organization, or enterprise, and may utilize a multimedia conferencing server.

A multimedia conferencing system may include, without limitation, a multimedia conferencing server or other processing device arranged to provide web conferencing services. For example, a multimedia conferencing server may include a server meeting component operative to control and mix different types of media content for a meeting and collaboration event, such as a web conference. A meeting and collaboration event may refer to any multimedia conference event offering various types of multimedia information in a real-time or live online environment.

In an embodiment, the multimedia conferencing system may further include one or more computing devices implemented as meeting consoles. Each meeting console may be arranged to participate in a multimedia event by connecting to the multimedia conference server. Different types of media information from the various meeting consoles may be received by the multimedia conference server during the multimedia event, which in turn distributes the media information to some or all of the other meeting consoles participating in the multimedia event. As such, any given meeting console may have a display with multiple media content views of different types of media content.

FIG. 1 is a block diagram representing a multimedia conferencing system 100 that can be used in conjunction with the invention. FIG. 1 is just one example of a multimedia conferencing system, and other multimedia conferencing systems can be used without departing from the scope of the invention. The multimedia conferencing system 100 may comprise, or form part of, a wired communications system, a wireless communications system, or a combination of both. For example, the multimedia conferencing system 100 may include one or more elements arranged to communicate information over one or more types of wired or wireless communications links.

In an embodiment, the multimedia conferencing system 100 may be arranged to communicate, manage or process different types of information, such as media information and control information. Examples of media information may generally include any data representing content meant for a user, such as voice information, video information, audio information, image information, textual information, numerical information, application information, alpha-numeric symbols, or graphics. Media information can also be referred to as "media content." Control information may refer to any data representing commands, instructions, or control words meant for an automated system. For example, control information may be used to route media information through a system, to establish a connection between devices, or instruct a device to process the media information in a predetermined manner.

In an embodiment, multimedia conferencing system 100 includes a multimedia conferencing server 110. The multimedia conferencing server 110 may comprise any logical or physical entity that is arranged to establish, manage or control a multimedia conference call between a local meeting console 120 and any number of remote meeting consoles 125 over a network 130. The local meeting console 120 and each of the remote meeting consoles 125 comprise one or more clients. The multimedia conferencing server 110 may comprise or be implemented as any processing or computing device, such as a computer, a server, a server array or server farm, a work station, a mini-computer, or a main frame computer. The multimedia conferencing server 110 may comprise or implement a computing architecture suitable for communicating and processing multimedia information.

The multimedia conference system 100 of FIG. 1 may include a conference room 140 to hold meetings, which include events having local participants 150-1, 150-2 . . . 150-$n$, where n equals an integer, located internally to the conference room 140. The multimedia conference system 100 also includes remote participants located externally to the conference room 140, which communicate with the conference room 140 via the one or more remote meeting consoles 125. The conference room 140 may include various multimedia input devices arranged to capture media content from the conference room 140 and stream the media content to the multimedia conferencing server 110. The various multimedia input devices may include one or more video cameras 160 and an array of microphones 165. The video cameras 160 capture video content, including video content of the local participants 150 present in the conference room 140. The video content is stream fed to the multimedia conferencing server 110 via the local meeting console 120. Similarly, the array of microphones 165 capture audio content, including audio content from the local participants 150 present in the conference room 140, which is stream fed to the multimedia conferencing server 110 via the local meeting console 120. The local meeting console 120 may include various media output devices, such as a display or video projector to show one or more graphical user interface views with video content and one or more speakers to disseminate audio content received from the remote participants via the multimedia conferencing server 110. A similar arrangement of the video camera 160, the array of microphones 165, and the video display and speakers, described for the conference room 140 may also be present at each of the remote locations, according to the size and configuration of the various remote locations.

The multimedia conference system 100 of FIG. 1 also illustrates a display adjusting component 170 as part of the local meeting console 120. In an embodiment of the invention, an image of each of the participants 150 can be captured by one or more of the video cameras 160. The display adjusting component 170 calculates the optimal size of the facial outline of a participant 150, based upon the size of each of the video conference displays of the meeting consoles 120 and 125. Calculations include determining the size and geometry of the image, and determining the distance of the image from the image capturing camera 160 by range finding techniques. A more detailed description for obtaining the facial outline is described below, with reference to FIG. 2. As an example, the optimal size of the facial outline is adjusted by the display adjusting component 170, such that a proportionately smaller image will be displayed on a larger video conference display. The proportionately smaller facial outline eliminates displaying an oversized facial image, which may be somewhat out of focus, or appear to be over bearing or of uncomfortable size. The proportionately smaller facial image could include more background as part of the video display. As another example, the optimal size of the facial outline is adjusted by the display adjusting component 170, such that a proportionately larger image will be displayed on a smaller video conference display. Since the viewing area of a small display screen is limited, the total video display area will primarily comprise the facial image with less background video content. An embodiment of the invention also comprises determining which participant 150 in the conference room 140 is presently speaking. Therefore, the image of the participant 150 who is presently speaking, which is also referred to as "the talking head," can be displayed in larger proportion in comparison to images of the other displayed participants 150, or "the talking head" could be displayed alone.

The displayed image can also be adjusted or resized by a display adjusting component 175 of the receiving remote meeting console 125. As an example, an image of the sending client from the local meeting console 120 is adjusted by the display adjusting component 175 of the one or more remote meeting consoles 125. The principles described above with regard to display adjusting component 170 of the local meeting console 120 are also applicable to the display adjusting component 175 of each of the remote meeting consoles 125. Therefore, an image can be adjusted or resized by either the display adjusting component 170 or the display adjusting component 175, or a combination of both display adjusting components. Using a combination of both display adjusting components would be advantageous when video camera capabilities are limited at one or more locations and an optimum image display cannot be achieved solely by the display adjusting component of one meeting console.

In an embodiment of the invention, the multimedia conferencing server 110 comprises a display adjusting component 180, as illustrated in FIG. 1. The display adjusting component 180 adjusts and resizes images from both the local meeting console 120 and any remote meeting consoles 125. The display adjusting component 180 negotiates from known factors of both the sending client and the receiving clients. The display adjusting component 180 communicates with the local meeting console 120 and the remote meeting consoles 125 via an interconnected computing network 130, where the interconnected computing network 130 could be a private LAN or WAN network or the Internet, for example. The display adjusting component 180 has at least the same capabilities as display adjusting component 170 or display adjusting component 175, as discussed above.

The display adjusting component of the sending client will usually adjust first to its capabilities, then the display adjusting component of the receiving client will further adjust as necessary. For example, the sending client may adjust the image to a larger size for display onto a small display screen. However, the clarity or definition may need to be improved, which can be accommodated by the receiving client. In an alternative embodiment, the display adjusting component of the server could do all of the adjusting. Combinations of any two or all display adjusting components could be utilized with the invention in order to optimize the displayed image.

Figure 2:
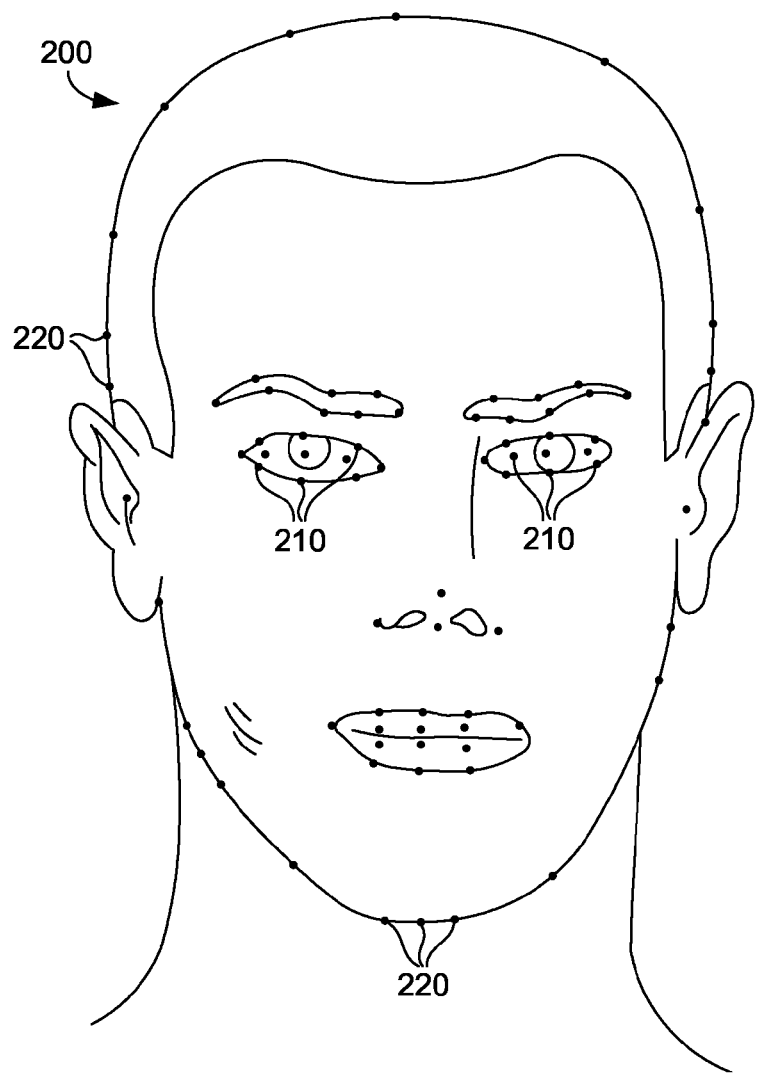
FIG. 2 is an illustration of an image outline system according to embodiments of the invention.

FIG. 2 illustrates a system by which an image outline can be achieved. An image 200, depicting the face of a person is shown. A plurality of feature points 210 are identified and positioned to indicate a readily recognizable image. In the illustrated example of FIG. 2, the feature points 210 are positioned to indicate the border of the eyebrows, eyes, nose, and mouth. These feature points 210 are grouped into connected sets 220, such as a facial outline. These connected sets 220 can be compared to a model object shape using, for example, the Active Shape Model technique. A model of the shape of an object is constructed by analysis of a set of example shapes. A shape model can be used to constrain a given shape to the range of plausible relative feature positions. These shapes are typically generated by manually annotating preferred feature positions on a set of exemplar images of an object. Principle components analysis is used to compactly model the range of allowable shapes in terms of a mean shape. Other systems of recognizing and identifying an object can be used without departing from the scope of the invention.

Adjusting and displaying an image of an object can be extended to non-person objects also, including inanimate objects. Video conference displays of adjusted images, according to embodiments of the invention described herein, can range from microscopic images, such as medical or scientific micrographs, to very large geographic images, such as landscapes or skyscraper buildings. Adjusted images of detailed objects, such as building plans, are also included. An embodiment of the invention also contemplates zooming in or out of the image, or panning around a total image to a specific point of interest or discussion. A live or on-site video stream feed captured by means of a camcorder, for example, is also contemplated by embodiments of the invention. The live or on-site video stream feed is adjusted as necessary, according to embodiments of the invention, then displayed to all participants of the video conference.

Figure 3:
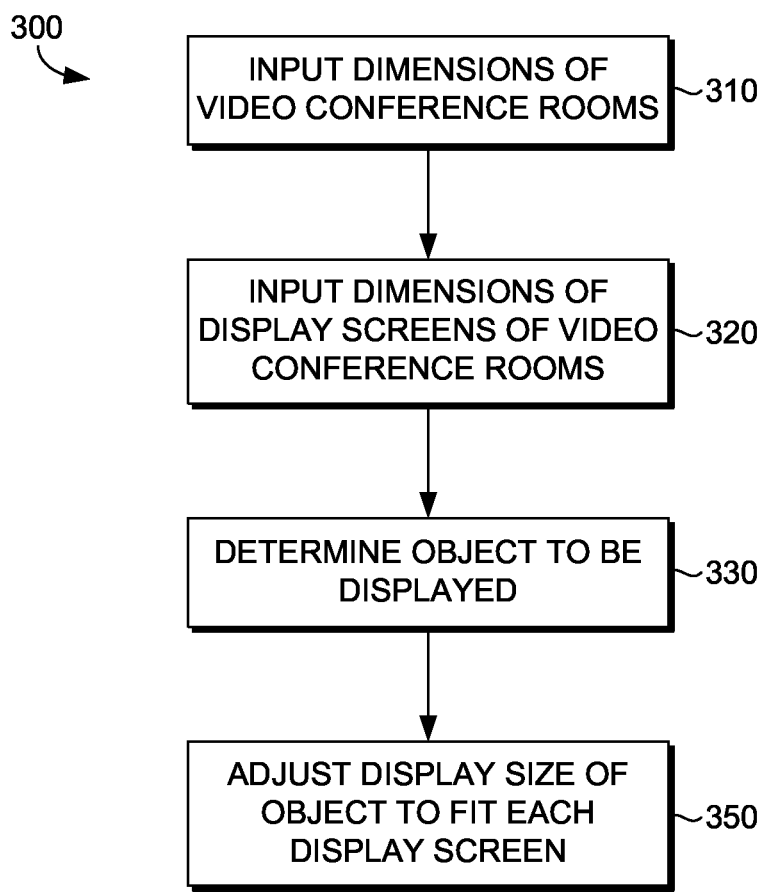
FIG. 3 is a flow diagram for a method of adjusting an image for video conference display according to embodiments of the invention.

A method of adjusting an image for video conference display 300 will now be described, with reference to FIG. 3. A video conference meeting is usually held within a conference room, but other environments are included within the scope of the invention. The dimensions of each conference room are inputted in step 310 for subsequent calculations. The dimensions of the local conference room, such as conference room 140, as well as the conference rooms at any remote locations are inputted. This information is saved in a computing system, such as the multimedia conferencing server 110, or it could be saved with each associated meeting console, such as local meeting console 120 and remote meeting consoles 125. The dimensions of each display screen of each associated conference room are inputted in step 320. Multiple conference rooms and associated multiple display screens are contemplated herein, as well as multiple sizes of display screens. An embodiment of the invention includes the display screen of a wireless device, such as a cellular phone or a personal digital assistant. This information is also saved in a computing system, such as the multimedia conferencing server 110, or it is saved with each associated meeting console, such as local meeting console 120 and remote meeting consoles 125.

An object that is to be displayed to the one or more display screens is determined in step 330. The object to be displayed could be the image of a person, and in particular, could be an image of the person who is presently speaking. This could be determined by voice activation sensors working in conjunction with one or more video cameras within the conference room. The object to be displayed could also be a non-person image or an inanimate object image. Inanimate objects of multiple sizes, dimensions, locations, and categories are within the scope of the invention described herein, as well as multiple types of electronic displays, such as textual information, numerical information, application information, alpha-numeric symbols, and graphics. An example of adjusting an electronic display image, such as an outline of a meeting agenda, could include viewing more of the electronic display in a single viewing on a large display screen, and viewing less of the electronic display in a single viewing on a small display screen. This would provide an optimal reading size for each of the different sized display screens. In addition, the object or objects to be displayed could comprise an on-site video stream feed.

The image of the object to be displayed is adjusted in step 350, such that the displayed image fits appropriately to each of the display screens, which may vary in size. A conventional video conference system displays the same proportional size of the image, regardless of the size of the display screen. As an example, the image of a person may occupy 50% of the total display screen area. Therefore, a large display screen would project a large life-sized image. This frequently results in the image being out of focus. In addition, a large sized image of a person can have the appearance of being over bearing or making conference viewers uncomfortable. Likewise, a conventional video conference system displays a small life-sized image onto a small display screen, which may be difficult to view clearly.

Embodiments of the invention utilize one or more display adjusting components in order to adjust the image to appropriately fit each of the various sized display screens. Therefore, the displayed image will be down-sized for a large display screen and include more background video content. Likewise, the displayed image will be up-sized for a small display screen with little or no background video content, thereby providing clearer detail and more attention on the image. Adjusting a displayed image to an appropriate fit is achieved by one or more display adjusting components. The local meeting console comprises a display adjusting component and each remote meeting console usually comprises a display adjusting component. The display adjusting component of the sending client will usually adjust the image first to its capabilities, then the display adjusting component of the receiving client will further adjust the image, but this is not a requirement of the invention. The multimedia conferencing server also comprises a display adjusting component, which negotiates from known factors of the sending and receiving clients, and works to overcome any limitations of either the sending or receiving clients. Embodiments of the invention contemplate using any of the display adjusting components alone or in any combination with each other.

One or more computer-readable media containing computer readable instructions embodied thereon, that when executed by a computing device, perform a method of adjusting an image for video conference display. This method of adjusting an image for video conference display may contain some or all of the steps discussed above.

Many different arrangements of the various components depicted, as well as components not shown, are possible without departing from the spirit and scope of the several embodiments of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of adjusting an image for video conference display, comprising:
   receiving dimensions of one or more video conference rooms;
   receiving dimensions of one or more display screens of the one or more video conference rooms, respectively;
   determining an object to be displayed to the one or more display screens; and
   adjusting a display size of the object to appropriately fit each of the one or more display screens via one or more display adjusting components, wherein adjusting the display size includes dynamically, inversely adjusting a display size of other elements in the video conference room that are not the object.

2. The method of claim 1, wherein the one or more display screens comprise a plurality of display screen sizes.

3. The method of claim 1, wherein the object comprises a portrait image of a person.

4. The method of claim 1, wherein said determining comprises recognizing a person that is presently speaking.

5. The method of claim 1, wherein said adjusting comprises displaying a proportionately smaller dimension of the object to fit a large display screen.

6. The method of claim 5, wherein said adjusting comprises displaying a proportionately larger amount of background video content.

7. The method of claim 1, wherein said adjusting comprises displaying a proportionately larger dimension of the object to fit a small display screen.

8. The method of claim 1, wherein the object comprises an inanimate object.

9. The method of claim 1, wherein the adjusting comprises adjusting the display size of the object via a sending client.

10. The method of claim 9, wherein the adjusting further comprises adjusting the display size of the object via a receiving client.

11. The method of claim 1, wherein the adjusting comprises adjusting the display size of the object via a server.

12. The method of claim 11, wherein the adjusting comprises server adjustments to overcome limitations of a camera of a sending client.

13. The method of claim 1, wherein the video conference display comprises an on-site video stream feed.

14. A video conference system, comprising:
   a local meeting console comprising: a video conference display, a sending client, and a local display adjusting component;
   one or more remote meeting consoles comprising: one or more video conference displays, one or more receiving clients, and one or more remote display adjusting components, each associated with the one or more remote meeting consoles, respectively;
   one or more cameras to capture an image of an object in a video conference room for display onto the one or more video conference displays;
   one or more microphones to capture audio exchanges of the local meeting console and the one or more remote meeting consoles;
   a multimedia conferencing server comprising a server display adjusting component, wherein at least one of the local display adjusting component, the one or more remote display adjusting components, and the server display adjusting component adjusts a display size of the object being displayed to appropriately fit each of the video conference displays, wherein adjusting the display size includes dynamically, inversely adjusting a display size of other elements in the video conference room that are not the object; and
   an interconnected computing network between the local meeting console, the one or more remote meeting consoles, and the multimedia conferencing server.

15. The video conference system of claim 14, wherein the object comprises a person that is presently speaking.

16. The video conference system of claim 14, wherein the object comprises an inanimate object.

17. The video conference system of claim 14, wherein the object comprises an on-site video stream feed.

18. The video conference system of claim 14, wherein the object comprises an electronic display of textual information or graphics.

19. One or more computer-readable storage media containing computer readable instructions embodied thereon that, when executed by a computing device, perform a method of adjusting an image for video conference display, the method comprising:

receiving dimensions of one or more video conference rooms;

receiving dimensions of one or more display screens of the one or more video conference rooms, respectively;

determining an object to be displayed to the one or more display screens; and adjusting a display size of the object to appropriately fit each of the one or more display screens via at least one of a display adjusting component of a sending client, a display adjusting component of a receiving client, and a display adjusting component of a video conferencing server, wherein adjusting the display size includes dynamically, inversely adjusting a display size of other elements in the one or more video conference rooms that are not the object.

* * * * *